(12) United States Patent
DeLuca et al.

(10) Patent No.: US 6,188,158 B1
(45) Date of Patent: Feb. 13, 2001

(54) SELF-LOCKING RETAINING MEMBER FOR USE IN A DYNAMOELECTRIC DEVICE

(75) Inventors: Kenneth M. DeLuca, O'Fallon, IL (US); Andrew F. Poag, St. Louis, MO (US); Charles P. Ketterer, Fenton, MO (US); Gary E. Horst, Manchester, MO (US)

(73) Assignee: Emerson Electric Co., St. Louis, MO (US)

( * ) Notice: Under 35 U.S.C. 154(b), the term of this patent shall be extended for 0 days.

(21) Appl. No.: 09/395,039

(22) Filed: Sep. 13, 1999

(51) Int. Cl.[7] ................................................ H02K 3/48
(52) U.S. Cl. ................................... 310/214; 310/254
(58) Field of Search ............................ 310/67 R, 91, 310/254, 214, 261; 29/596–598

(56) References Cited

U.S. PATENT DOCUMENTS

| | | | |
|---|---|---|---|
| 3,355,610 | * 11/1967 | Staff | 310/214 |
| 4,433,262 | * 2/1984 | Greenlee | 310/214 |
| 4,633,116 | * 12/1986 | Derderian | 310/214 |
| 5,973,432 | * 10/1999 | Katagiri et al. | 310/214 |

* cited by examiner

Primary Examiner—Tran Nguyen
(74) Attorney, Agent, or Firm—Howell & Haferkamp, LC (57) ABSTRACT

A dynamoelectric device utilizes retaining members to prevent the windings from migrating into the air-gap between the stator and the rotor. The retaining members used in the device are axially self-locking, thereby preventing undesired axial translation of the retaining members during severe operating conditions of the dynamoelectric device.

19 Claims, 5 Drawing Sheets

SELF-LOCKING RETAINING MEMBER FOR USE IN A DYNAMOELECTRIC DEVICE

BACKGROUND OF THE INVENTION (1). Field of the Invention

This invention pertains to the field of dynamoelectric devices such as electric motors and generators that are used to convert energy in either electrical or mechanical form into the other. More particularly, this invention pertains to the use of a self-locking retaining member, frequently referred to as a top stick, positioned between stator poles to prevent windings from entering the air gap between the stator and rotor. The use of self locking retaining members increases the safety and reliability of dynamoelectric devices by preventing undesirable axial translation of retaining members that may occur during severe operating conditions of dynamoelectric devices.

(2). Description of the Related Art

Figure 1:
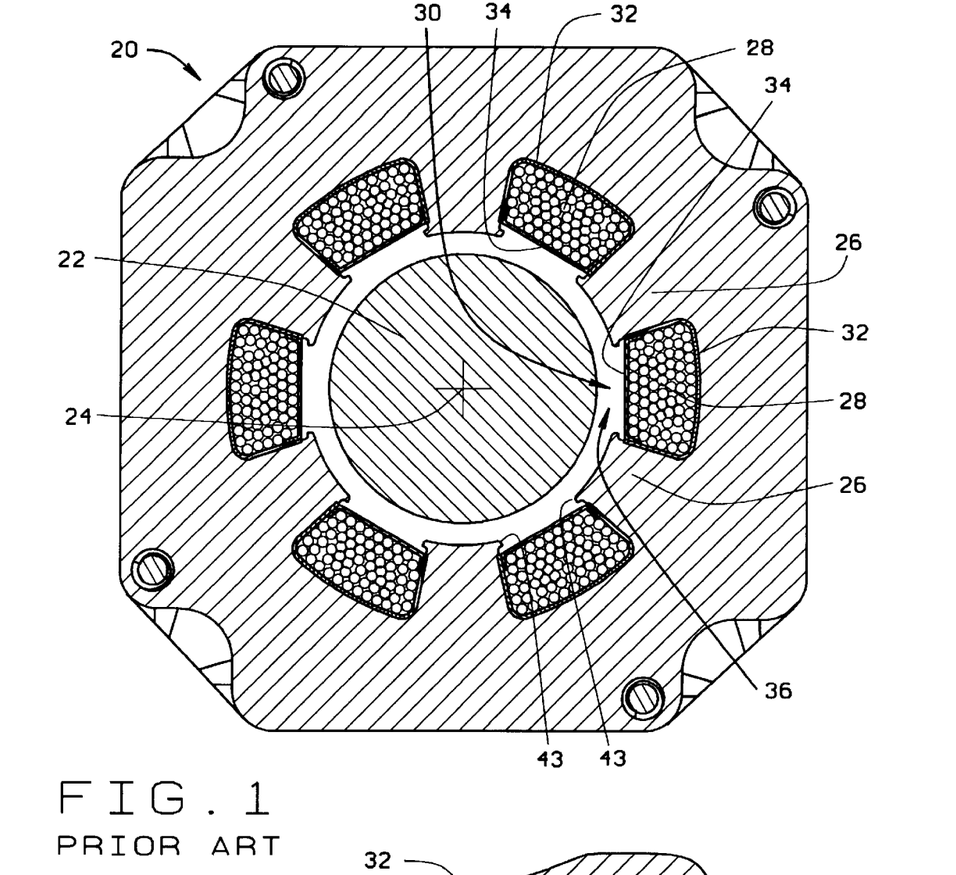
FIG. 1 is an end view, in section, of a prior art dynamoelectric device.

There are numerous types of dynamoelectric devices in the prior art. A typical dynamoelectric device of the prior art in represented generally by the numeral 20 as shown in cross-section in FIG. 1. In general, the dynamoelectric device is comprised of a rotor 22 that is revolvable about an axis 24, a plurality of stator poles 26 positioned circumferentially about the rotor 22, and windings 28. A slot 30 extending in the direction of the axis 24 is formed between every two immediately adjacent stator poles 26, as is more clearly shown in detail in FIG. 2. The windings 28 consist of at least one electrically conductive coated wire wound within the slots 30 about one or more of the stator poles 26.

Figure 2:
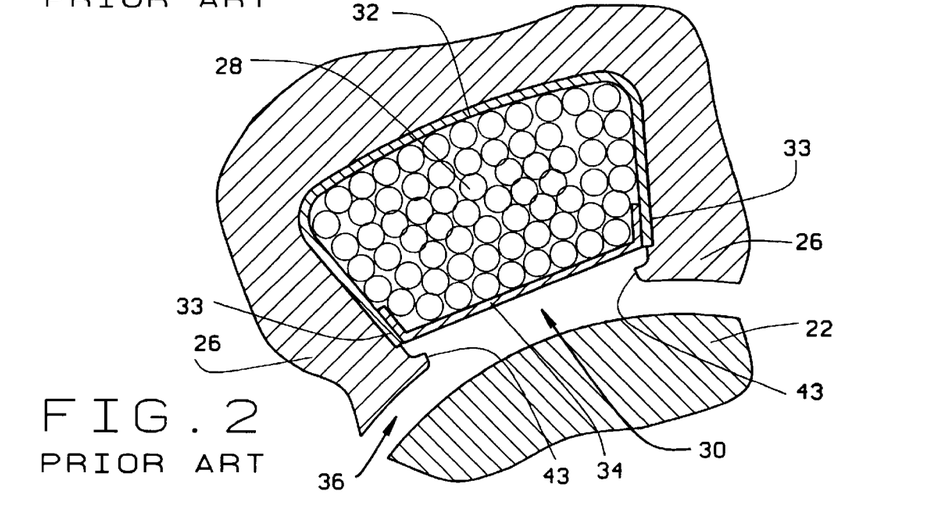
FIG. 2 is a detailed partial view, in section, of a prior art dynamoelectric device showing a single slot.

Typically, a slot liner 32 is positioned between the windings 28 and the stator poles 26 within the slots 30 to prevent the windings 28 from directly contacting the stator poles 26. The slot liners 32 are generally rectangular insulating sheets made of polymeric or fibrous material and have two opposite ends 33, the first end 33 positioned adjacent one of the two stator poles 26 that defines the slot 30 and the second end 33 positioned adjacent the other stator pole 26. Additionally, a liner cap 34 made of material similar to the slot liner 32, commonly referred to as a wedge, may extend from the first end 33 of the slot liner 32 to the second end 33, thereby covering the inner most surface of the windings 28. By "inner" and "inwardly", what is meant is, radially inward toward the axis 24 of the rotor 22.

A failure mode of such prior art devices arises when the windings 28 migrate from between stator poles 26 radially inward into the air gap 36 between the rotor 22 and stator poles 26, interfering with the moving rotor assembly. This failure occurs frequently in devices with large slot fills or large slot openings between stator poles wherein typical wire retention methods are insufficient. This is often a concern in switched reluctance motors that are subject to high winding temperatures or vibration loads. Recently, this failure mode has become an increasing concern when utilizing switched reluctance motors in safety critical applications such as in the automotive steering industry.

In those prior art devices having liner caps 34, they are generally radially non-rigid and therefore unable to prevent radial migration of the windings 28. One method utilized in prior art devices to prevent winding migration has been to varnish the windings, thereby preventing the wire passes that comprise the winding from moving independently of one another. This method has been shown to be beneficial in preventing winding migration but not at elevated winding temperatures. At elevated winding temperatures, the varnish strength is reduced and the varnish may therefore be unable to prevent winding migration. Additionally, the varnishing process typically has a considerably lengthy cycle time and high burden cost during production of dynamoelectric devices.

To reduce the cycle time and burden cost associated with the varnishing method, a similar method of preventing the wire passes that comprise the winding from moving independently of one another has been to utilize bondable wire coatings. This method, as is the case with the varnish method, is beneficial in preventing winding migration but not at elevated winding temperatures.

Figures 3, 4, 5:
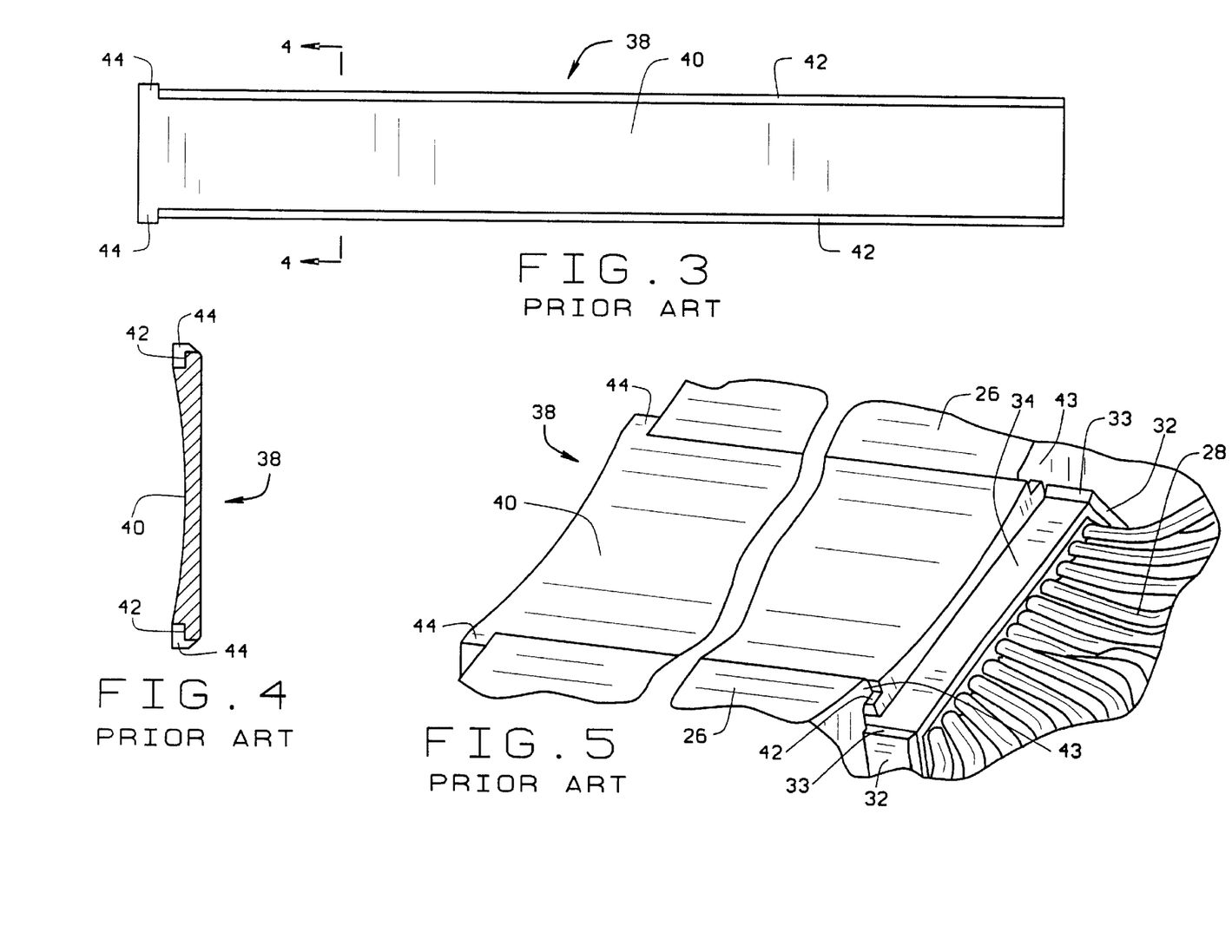
FIG. 3 is a plan view of a prior art retaining member.
FIG. 4 is a view, in section, of the prior art retaining member along the line 4—4 of FIG. 3.
FIG. 5 is an isometric view of the prior art retaining member installed in a dynamoelectric device.

To prevent winding migration inherent to both the varnish and bondable wire coating methods at elevated temperatures, retaining members, commonly referred to as top sticks, have been developed in the prior art to provide a barrier between the windings 28 and the air gap 36 between the stator and rotor. This method is typically used as a secondary restraint in conjunction with other retention methods such as utilizing a bondable coating on the windings 28. Prior art retaining members are generally rectangular members that are slid axially into the slots between stator poles during assembly of the dynamoelectric devices. A typical prior art retaining member 38 is shown in FIGS. 3–5. The top stick retaining member 38 is shown in a plan view in FIG. 3 with its radially inner side shown. The retaining member is shown in cross section in FIG. 4. FIG. 5 is a partial view of the retaining member in one operative environment assembled in a dynamoelectric device between a pair of adjacent stator poles 26 and retaining a winding 28 between the poles.

The prior art retaining member 38 is formed of a generally rigid material that provides a barrier in the slot 30 between the windings 28 and the air gap 36. As can be seen in FIGS. 4 and 5, the prior art retaining member 38 has a radially inner surface 40 that faces inwardly toward the rotor and has a width slightly less than that of the slot 30 in which it is positioned. The inner surface 40 is often slightly curved, matching the radius of the inward most surfaces of the stator poles 26 so as to maintain a uniform air gap 36 between the rotor 22 and stator poles 26. The T-shaped cross section of the main body of the retaining member 38 as seen in FIG. 4 provides the main body with side rails 42 that are slightly farther apart than the narrowest portion of the width of the slot 30. The rails 42 engage with inner edges 43 of the pair of adjacent stator poles to hold the retaining member 38 radially in the slot. Thus, when an inward force is applied to the prior art retaining member, the side rails 42 prevent the prior art retaining member 38 from translating inward by engaging both the stator poles 26 that define the slot 30.

In addition to the main body, prior art retaining members 38 have also been provided with end stops 44 positioned at one axial end of the retaining member 38. The end stops 44 project outwardly beyond the width of the retaining member's inner surface 40 as seen in FIG. 4 and therefore are unable to fit within the slot 30 between adjacent stator poles 26. During installation into a dynamoelectric device, the end of the retaining member 38 axially opposite the end stops 44 is inserted axially into the slot 30. The configuration of the retaining member 38 allows it to slide axially between the inner edges 43 of the adjacent stator poles 26 until the end stops 44 engage the stator poles 26 or another axially rigid portion of the device. Thereafter, the end stops 44 prevent axial over insertion of the retaining member 38, thereby increasing the ease of their installation.

Retaining members are advantageous over other prior art solutions in that, when properly axially aligned, they effectively prevent excessive winding migration toward the gap 36 between the stator and rotor while maintaining a low burden cost during production. However, a disadvantage associated with such prior art retaining members has been an undesired axial movement of the retaining members as a result of severe three dimensional vibration and thermal expansion and contraction of the stator poles relative to the retaining member during the life of the dynamoelectric device. In prior art devices which utilize the varnish method in combination with retaining members 38, axial movement of the retaining members is limited slightly by the varnish if the retaining member is installed prior to the varnishing process. In prior art devices which utilize the bondable wire coating method, prior art retaining members 38 do not have any means other than friction against the inner edges 43 of the adjacent stator poles 26, windings 28, or against the liner cap 34 that prevents them from axially translating in a direction opposite to the direction in which they were inserted and tend to back-out in such severe situations. Additionally, the amount of friction is often minimized to ease assembly of the retaining member. The axial migration of the prior art retaining members can result in a portion of the windings entering the air gap between the rotor and stator or ultimately contacting the rotor assembly, thereby decreasing the performance or life of the device. Axial migration of the retaining members may also result in undesired interference of the retaining members with other rotating parts located on the rotor assembly.

The present invention overcomes the disadvantages associated with the use of prior art retaining members by providing a locking mechanism on the retaining members so as to prevent their undesired axial movement. The invention provides reliable operation of dynamoelectric devices without the need for costly varnishing and without adding additional components to prior art devices already utilizing retaining members.

SUMMARY OF THE INVENTION

The retaining members of the present invention are designed to be used in place of conventional retaining members. In accordance with the dynamoelectric device of the invention and the method of axially locking retaining members within a dynamoelectric device in accordance with this invention, a locking mechanism is provided on the retaining member. When the retaining member is in its proper position, the locking mechanism engages a restraining portion of the dynamoelectric device so as prevent undesired axially translation of the retaining member.

In general, the dynamoelectric device of the present invention comprises a rotor having an axis of rotation, a plurality of stator poles and windings positioned circumferentially about the rotor, and self-locking retaining members. The windings and retaining members are located within the slots formed between the stator poles, with the retaining member being nearest the rotor so as to act as a barrier between the windings and the rotor. A locking mechanism is provided on each retaining member preventing undesired axial migration of the member.

In another aspect of the present invention, a method for preventing windings from entering the air gap between a stator and rotor of a dynamoelectric device comprises axially sliding a retaining member into a slot between two stator poles. When the proper axial position of the retaining member is reached, it is automatically axially locked in place and is radially positioned between the windings and the rotor so as to prevent winding migration into the air gap.

While the principle advantages and features of the present invention have been described above, a more complete and thorough understanding of the invention may be attained by referring to the drawings and detailed description of the preferred embodiments, which follow.

BRIEF DESCRIPTION OF THE DRAWINGS

References characters in the written specification indicate corresponding parts throughout the several views of the drawings.

DETAILED DESCRIPTION OF THE INVENTION

The embodiments of the retaining member used in the present invention are similar to prior art retaining members. The embodiments incorporate the general T-shaped cross section, the slightly curved inner surface 40, side rails 42 that engage with the inner edges 43 of the adjacent stator poles 26, and end stops 44 of the prior art retaining members 38 described in detail in the discussion of the background of the invention. For that reason, these aspects of the invention are given the same reference numbers in the Figures and their description is not repeated in this section.

Figure 6:
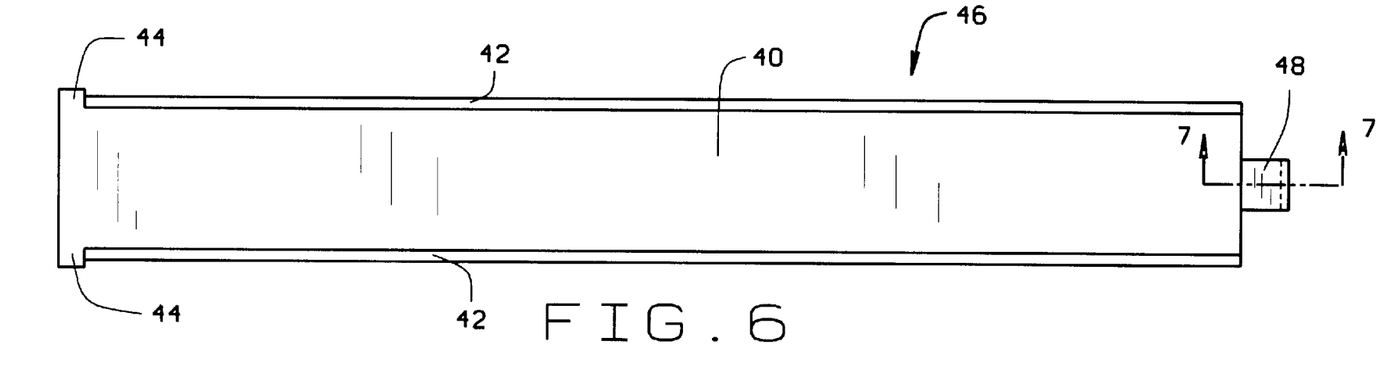
FIG. 6 is a plan view of the preferred embodiment of the retaining member of the invention.
Figure 7:
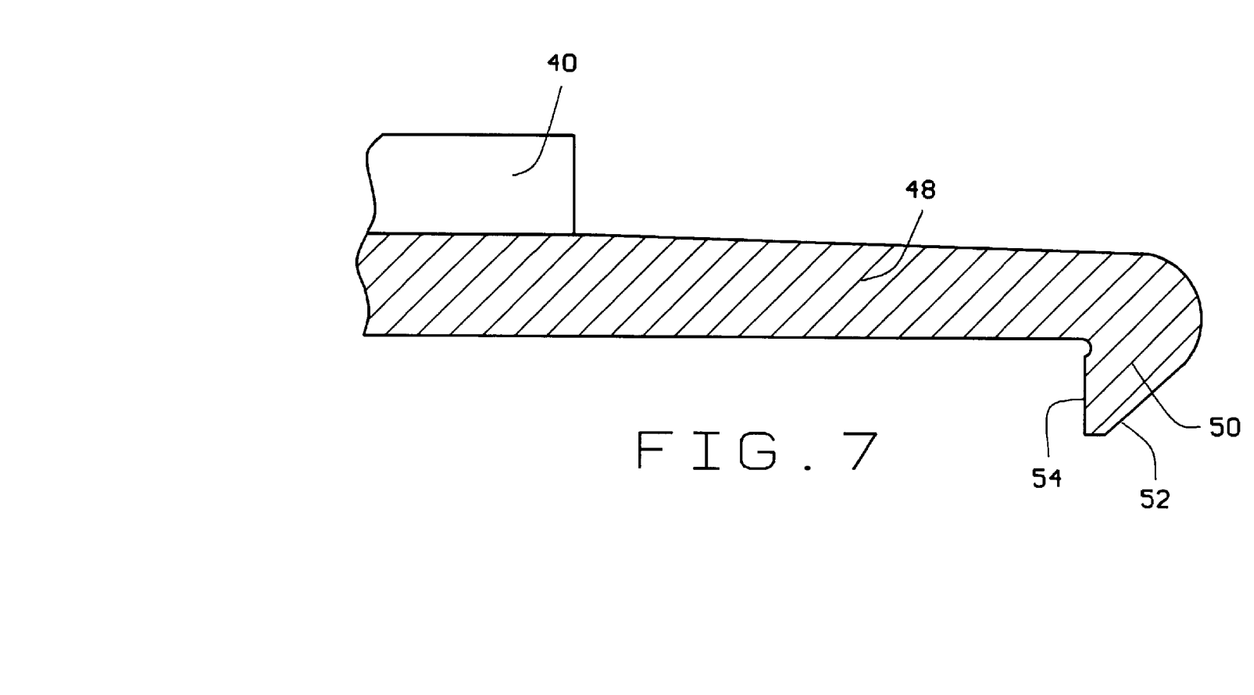
FIG. 7 a detailed partial view, in section, of the tab of the preferred embodiment taken along the line 7—7 of FIG. 6.

Unlike the prior art retaining members 38, the preferred embodiment, shown as retaining member 46 in FIG. 6, utilizes an additional locking mechanism in the form of a tab 48. The tab 48 as shown in detail in FIG. 7, is generally thinner and narrower than the main body of the retaining member 46 so as to allow it to easily deflect when a radial force is directly applied to the tab 48. As can be seen from the detail of the tab 48 in FIG. 7, a wedge shaped protrusion 50 extends radially outward from the end of the tab 48. The wedge shaped protrusion 50 has a sloped surface 52 nearest the end of the tab 48 and a locking surface 54 adjacent thereto.

Figure 8:
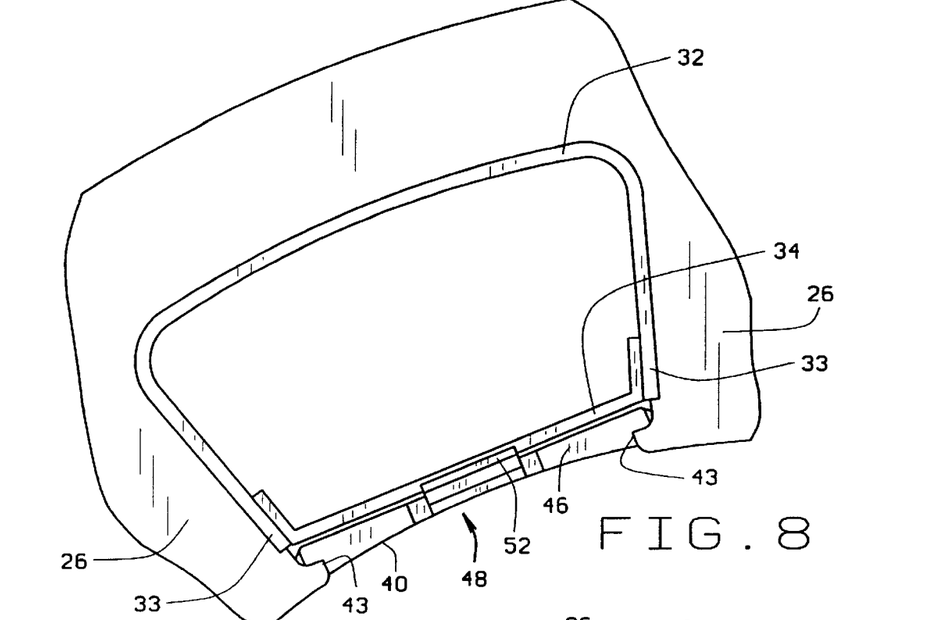
FIG. 8 is a detailed partial view of the preferred embodiment installed in a dynamoelectric device. For clarity purposes, the windings are not shown.
Figure 9:
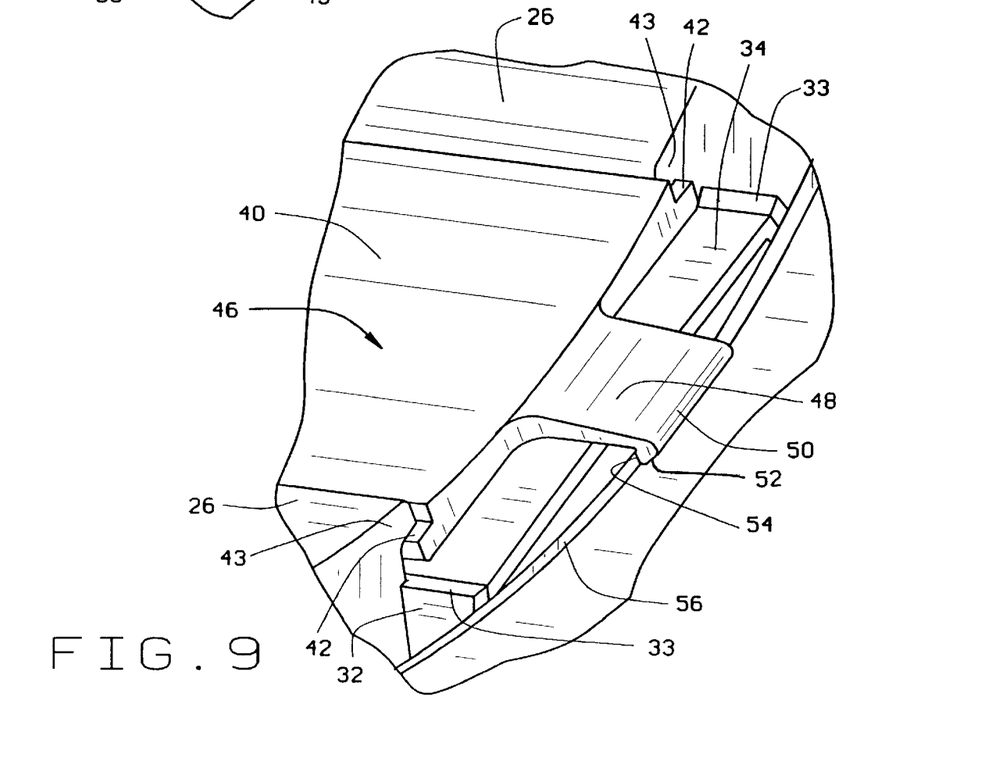
FIG. 9 is a partial isometric view, in detail, showing the preferred embodiment of the invention in a dynamoelectric assembly.

The preferred embodiment of the retaining member 46 of the invention is adapted to be inserted into a position completely closing the slot 30 by axially sliding it into place between the inner edges 43 of the two adjacent stator poles 26. When the retaining member 46 is being axially translated, the sloped surface 52 of the tab 48 could contact a portion of the dynamoelectric device, for example the windings 28 or the liner cap 34, which would exert an inward radial force on the tab 48. This force would cause the tab 48 to deflect and axially pass over that portion of the device that engaged the sloped surface 52 of the tab 48 without preventing further axial translation of the retaining member 46. When the retaining member 46 is in its proper position covering the stator slot, the tab 48 is, at least partially, in its original undeflected position. The tab is designed to engage with an existing portion of the dynamoelectric device, for example the end turns of the windings 28, the liner cap or wedge 34, or an end cap that covers the winding end turns (not shown). The sloped surface 52 of the tab allows the tab to flex and pass over the portion of the device with the resiliency of the tab causing the tab to snap back to its original orientation bringing the locking surface 54 into engagement with the portion of the device. This snapping of the tab 48 over the portion of the device prevents or limits axial translation of the retaining member 46 in the opposite direction to that of its insertion by the locking surface 54 of the tab 48 engaging with the portion of the device when such translation occurs. In the preferred embodiment of the invention, the restraining portion of the of the dynamoelectric device is the edge of the liner cap 34 as shown in FIG. 8. However, as set forth above, the retaining member 46 could just as easily utilize another portion of the device such as an edge of a housing cover or the edge of the windings. Each of the portions of the dynamoelectric device with which the tab 48 can engage and lock against are intended to be represented schematically in FIG. 9 as portion 56.

It is important to understand that while the preferred embodiment of the invention is described as having a wedged shaped protrusion 50 with a sloped surface 52 that deflects the tab 48 during insertion of the retaining member 46, the wedge shaped protrusion 50 and sloped surface 52 could just as easily deflect the restraining portion of the dynamoelectric device rather than the tab 38 and achieve similar results. For example, the windings 28 or liner cap 34 could deflect as the retaining member 46 is inserted and then engage with the locking surface 54 of the tab 48. Finally, the locking mechanism tab 48 could engage with a portion of the dynamoelectric device and also prevent further axial translation in the direction of installation, thereby eliminating the need for the end stops 44. This could be accomplished by the tab engaging in a complementary slot in the device, thereby preventing movement of the retaining member in both axial directions.

Figure 10:
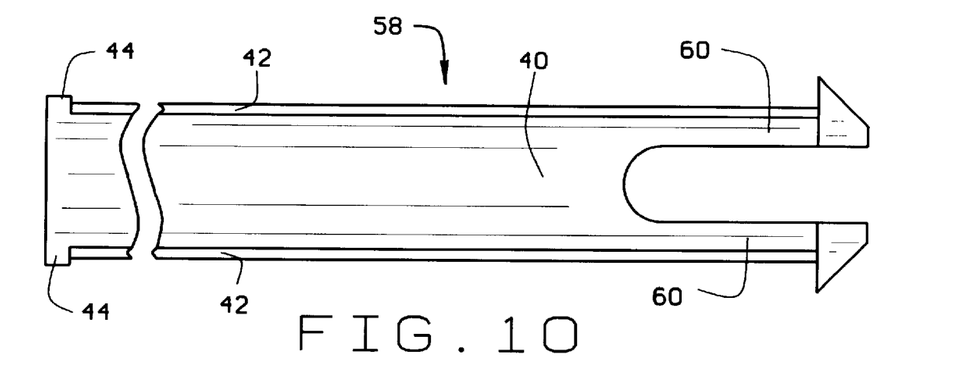
FIG. 10 is a fragmented plan view of an alternative embodiment retaining member of the invention.

An alternative of the preferred embodiment is shown in FIG. 10. The retaining member 58 is shown having two tabs 60 that deflect towards each other rather than radially. This embodiment utilizes similar wedge shaped protrusions that deflect against the stator poles 26 as the retaining member 58 is slid axially into the assembly. Once the retaining member 58 is in its proper position, the tabs 60 deflect back away from each other over the edges of the stator poles 26. Thus, in this alternative embodiment of the retaining member 58, the stator poles 26 act as the corresponding restraining portion of the dynamoelectric device. This embodiment of the invention could just as easily have only one tab 60 and function equivalently.

Figure 11:
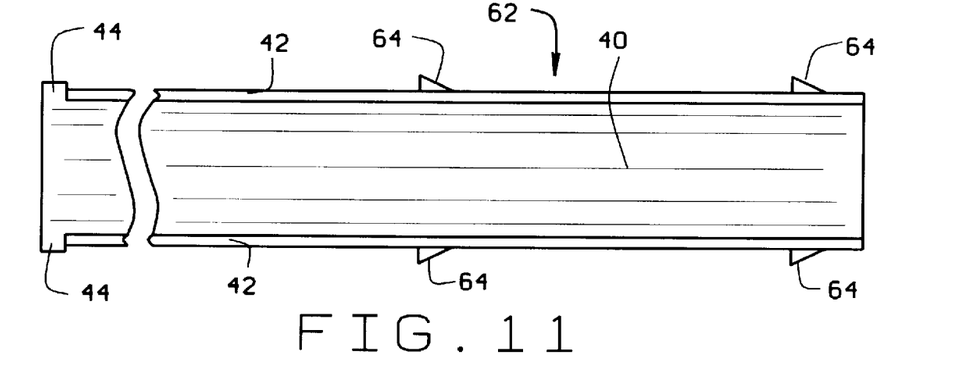
FIG. 11 is a fragmented plan view of another alternative embodiment of the retaining member of the invention.

Another alternative embodiment is shown in FIG. 11. This retaining member 62 utilizes one or more barbs 64 that act as the locking mechanism. The barbs 64 extend from the side rails 42 to engage the stator poles 26 in an interference fit, or engage in recessed slots in the sides of the poles. The wedge shape of the barbs 64 allows the retaining member 62 to axially translate more easily during installation and they resist axial translation in the opposite direction.

Figure 12:
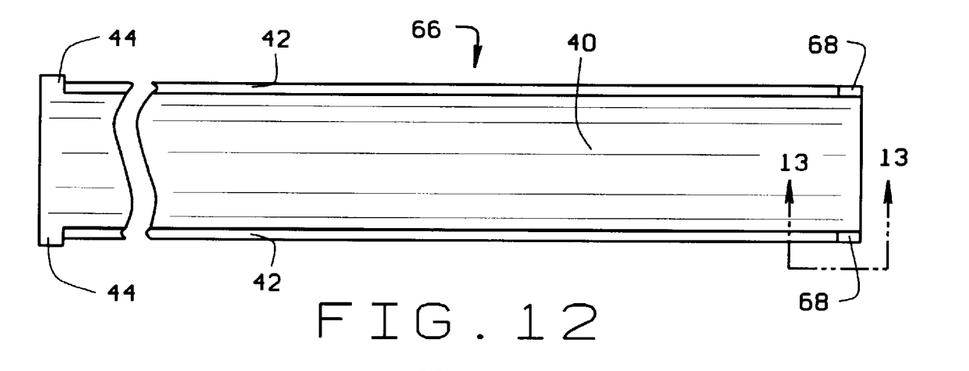
FIG. 12 is a fragmented plan view of another alternative embodiment of the retaining member of the invention.
Figure 13:
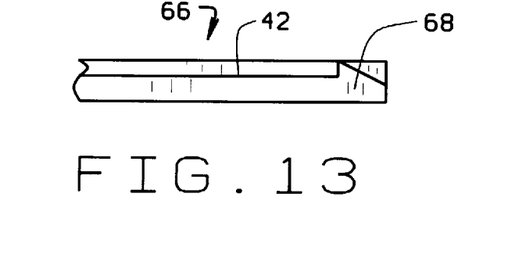
FIG. 13 is a detailed partial view, in section, of the retaining member of FIG. 12 taken along the line 13—13 of FIG. 12.

Yet another alternative embodiment of the retaining member 48 is shown in FIGS. 12 and 13. This retaining member 66 utilizes two wedge shaped protrusions 68 that project radially inward from the side rails 42. During installation of the retaining member 66, the protrusions 68 engage the surface the stator poles 26 that is normally in contact with the side rails 42. This contact forces the entire retaining member to deflect the liner cap 34 or the windings 28. Just as the retaining member 66 reaches its proper axial position, the protrusions 68 pass over the edge of the stator poles 26 and the liner cap 34 or windings 28 force the side rails 42 against the stator poles 26. Once in position, the wedge shape of the protrusions 68 prevent the retaining member from translation axially in the opposite direction by engaging the sides of the stator poles 26.

In accordance with the invention, the preferred method of manufacturing a dynamoelectric device as shown in FIGS. 6–9 comprises the step of inserting a retaining member 46 into the device by axially sliding it into one of the slots between two inner edges 43 of adjacent stator poles 26. The insertion is continued until the end stops 44 engage the stator poles 26 preventing further insertion and the locking mechanism tab 48 or one of its alternate embodiments engages with a portion of the dynamoelectric device as described above. When the retaining member is in its proper position, axial translation in the opposite direction is prevented by the locking surface 54 of the wedge shape protrusion 50 on the tab 48 engaging the portion of the dynamoelectric device. The preferred method of manufacturing the dynamoelectric assembly is not limited to the use of the retaining member shown in FIGS. 6–9 and could also be practiced using retaining members similar to those shown in FIGS. 10–13 or their equivalents as described above.

While the present invention has been described by reference to specific embodiments, it should be understood that modifications and variations of the invention may be constructed without departing from the scope of the invention defined in the following claims.

What is claimed:

1. A dynamoelectric device comprising:
   a rotor having an axis of rotation;
   a plurality of stator poles positioned circumferentially about the rotor axis, the stator poles being circumferentially spaced apart defining slots extending axially between adjacent stator poles;
   a plurality of windings, each winding being at least one electrically conductive wire wound about at least one stator pole; and
   at least one retaining member, the at least one retaining member being positioned within one of the slots, the at least one retaining member having a main body operatively connected to both adjacent stator poles that form the slot, the main body being restrained by the adjacent stator poles from moving radially inward, the main body also being radially positioned between one or more of the windings and the rotor where the main body will prevent the one or more of the windings from contacting the rotor should the windings move radially inward, the retaining member also having at least one locking mechanism that engages a cooperating locking portion of the dynamoelectric device to limit axial translation of the retaining member relative to the stator poles, the locking mechanism including a first protrusion that is positioned on the main body to limit axial translation of the retaining member in a first direction and a second protrusion that is positioned on the main body to limit axial translation of the retaining member in an opposite, second direction, the first and second protrusions thereby limiting axial translation of the retaining member relative to the stator poles.

2. The dynamoelectric device of claim 1 wherein:

each pair of adjacent stator poles that form a slot have mutually opposed inner edges that extend axially along the stator poles; the main body of the retaining member is generally rectangular in shape and has a pair of rails that extend axially along opposite edges of the main body; and the pair of rails of the main body engage with the inner edges of adjacent stator poles thereby preventing the retaining member from radially translating inward should a radially inward force be applied to the retaining member.

3. The dynamoelectric device of claim 1 wherein:

the first protrusion of the retaining member is wedged shaped, the first protrusion is also resilient and is adapted to deflect when it comes into contact with a portion of the dynamoelectric device as the retaining member is translated axially in the second direction during installation of the retaining member between adjacent stator poles.

4. The dynamoelectric device of claim 1 wherein:

the first protrusion of the retaining member is wedged shaped, and the dynamoelectric device has a resilient restraining portion that is adapted to deflect when it comes into contact with the first protrusion as the retaining member is translated axially in the second direction during installation of the retaining member between adjacent stator poles.

5. The dynamoelectric device of claim 1 wherein:

the second protrusion is positioned on the main body where it will permit the retaining member to translate axially in the second direction during installation of the main body between adjacent stator poles and where it will engage with the adjacent stator poles when the main body is positioned between adjacent stator poles to thereby prevent further translation in the second direction.

6. The dynamoelectric device of claim 1 further comprising:

at least one slot liner; the at least one slot liner being a generally thin flat sheet and having first and second axially oriented parallel edges and third and fourth parallel edges therebetween, the at least one slot liner being positioned within one of the slots between the windings and the pair of adjacent stator poles defining the slot, the first axially oriented parallel edge being positioned adjacent one of the stator poles and the second axially oriented parallel edge being positioned against the other stator pole of the adjacent stator poles; and a liner cap, the liner cap being a generally thin sheet and having two axially oriented edges and two parallel edges therebetween, one of the axially oriented edges of the liner cap being adjacent to the first axially oriented parallel edge of the slot liner and the other axially oriented edge of the liner cap being adjacent to the second axially oriented parallel edge of the slot liner, the liner cap being positioned within the slot covering a surface of the windings nearest the rotor axis.

7. The dynamoelectric device of claim 6, wherein:

the first protrusion is positioned on the retainer body where it will engage with the liner cap to limit axial translation of the retaining member in the first direction.

8. In a dynamoelectric device including:

a rotor having an axis of rotation;

a plurality of stator poles positioned circumferentially about the rotor axis, the stator poles being circumferentially spaced apart defining slots extending axially between adjacent stator poles;

a plurality of windings, each winding being at least one electrically conductive wire wound about at least one stator pole; and at least one retaining member having opposite axial ends, the at least one retaining member being positioned within one of the slots and also having a main body operatively connected to both adjacent stator poles that form the slot, the main body being restrained by the adjacent stator poles from moving radially inward, the main body being radially positioned between one or more of the windings and the rotor where the main body will prevent the one or more of the windings from contacting the rotor should the windings move radially inward;

an improvement comprising:

at least one locking mechanism formed on the retaining member, the locking mechanism being a resilient tab that has a free end, the tab extends axially from one of the axial ends of the retaining member to the free end of the tab, the tab having a wedge shaped protrusion at its free end, the wedge shaped protrusion having a sloped surface that tapers towards the free end of the tab and a locking surface that is adjacent the sloped surface and on an opposite side of the sloped surface from the free end of the tab, the sloped surface of the wedge shaped protrusion being adapted to radially deflect the tab when the retaining member is being axially inserted, tab first, into the slot and the locking surface is adapted to engage a portion of the dynamoelectric device to limit axial translation of the retaining member relative to the stator poles once the retaining member is fully inserted into the slot of the dynamoelectric device.

9. In a dynamoelectric device including:

a rotor having an axis of rotation;

a plurality of stator poles positioned circumferentially about the rotor axis, the stator poles being circumferentially spaced apart defining slots extending axially between adjacent stator poles;

a plurality of windings, each winding being at least one electrically conductive wire wound about at least one stator pole; and at least one retaining member having opposite axial ends, the at least one retaining member being positioned within one of the slots and also having a main body operatively connected to both adjacent stator poles that form the slot, the main body being restrained by the adjacent stator poles from moving radially inward, the main body being radially positioned between one or more of the windings and the rotor where the main body will prevent the one or more of the windings from contacting the rotor should the windings move radially inward, an improvement comprising:

at least one locking mechanism formed on the retaining member, the locking mechanism being a pair of resilient arms that extend axially from one of the axial ends of the retaining member to free ends of the arms, the arms having wedge shaped protrusions, each wedge shaped protrusion having a sloped surface that tapers toward the free end of the arm and a locking surface that is adjacent the sloped surface and on an opposite side of the sloped surface from the free end of the arm, the sloped surfaces of the wedge shaped protrusions being adapted to engage inner edges of the adjacent stator poles to deflect the arms toward each other when the retaining member is being axially inserted, arms first, into the slot, the locking surfaces being adapted to engage a portion of the stator poles to limit axial translation of the retaining member relative to the stator poles once the retaining member is fully inserted into the slot and the sloped surfaces of the wedge shaped protrusions pass the stator poles.

10. In a dynamoelectric device including:

a rotor having an axis of rotation;

a plurality of stator poles Positioned circumferentially about the rotor axis, the stator poles being circumferentially spaced apart defining slots extending axially between adjacent stator poles;

a plurality of windings, each winding being at least one electrically conductive wire wound about at least one stator pole; and at least one retaining member, the at least one retaining member being positioned within one of the slots and also having a main body operatively connected to both adjacent stator poles that form the slot by being axially inserted into the slot of the dynamoelectric device, the main body being restrained by the adjacent stator poles from moving radially inward, the main body being radially positioned between one or more of the windings and the rotor where the main body will prevent the one or more of the windings from contacting the rotor should the windings move radially inward, an improvement comprising:

at least one locking mechanism formed on the retaining member, the locking mechanism engaging with a portion of the dynamoelectric device to limit axial translation of the retaining member relative to the stator poles, the locking mechanism being at least one wedge shaped barb projecting toward and engaging with an adjacent stator pole.

11. In a dynamoelectric device including:

a rotor having an axis of rotation;

a plurality of stator poles positioned circumferentially about the rotor axis, the stator poles being circumferentially spaced apart defining slots extending axially between adjacent stator poles;

a plurality of windings, each winding being at least one electrically conductive wire wound about at least one stator pole; and at least one retaining member having opposite axial ends with one axial end being an insertion end, the at least one retaining member being positioned within one of the slots and also having a main body operatively connected to both adjacent stator poles that form the slot by being axially inserted into the slot, the main body being restrained by the adjacent stator poles from moving radially inward, the main body being radially positioned between one or more of the windings and the rotor where the main body will prevent the one or more of the windings from contacting the rotor should the windings move radially inward, an improvement comprising:

at least one locking mechanism formed on the retaining member, the locking mechanism being at least one wedge shaped protrusion extending from the main body of the retaining member, the wedge shaped protrusion having a sloped surface that tapers toward the insertion end of the retaining member and a locking surface adjacent the sloped surface and on an opposite side of the sloped surface from the insertion end of the retaining member, the sloped surface of the wedge shaped protrusion being adapted to engage an adjacent stator pole to radially translate the retaining member from its proper radial position as the retaining member is being axially inserted into the dynamoelectric device and to disengage the stator pole once the retaining member is fully inserted into the slot, the locking surface being adapted to engage a portion of the stator pole to limit axial translation of the retaining member relative to the stator poles once the sloped surface disengages the stator pole.

12. The dynamoelectric device of claim 11 wherein:

the one wedge shaped protrusion of the locking mechanism is one of a pair of wedge shaped protrusions.

13. The dynamoelectric device of claim 12 wherein:

the pair of wedge shaped protrusions are positioned on opposite sides of the main body and at the insertion end of the retaining member.

14. The dynamoelectric device of claim 13 wherein:

the pair of wedge shaped protrusions have a pair of locking surfaces that are positioned to engage with the adjacent stator poles once the retaining member is fully inserted into the slot.

15. A retaining member for use in a dynamoelectric device having windings in a slot between adjacent poles of the device to limit migration of the windings from between the adjacent poles and out of the slot, the retaining member comprising:

a main body having opposite axial edges that are configured to engage the adjacent poles so as to hold the retaining member and the windings in the slot when the retaining member is used in the dynamoelectric device, the retaining member also having axially opposite ends and at least one locking mechanism that is configured to engage a cooperating locking portion of the dynamoelectric device to limit axial translation of the retaining member relative to the adjacent poles, the locking mechanism being a first protrusion that is positioned at one of the axially opposite ends of the main body to limit axial translation of the retaining member in a first direction and a second protrusion that is positioned at the opposite axial end of the main body to limit axial translation of the retaining member in an opposite, second direction, the first and second protrusions thereby limiting axial translation of the retaining member relative to the adjacent poles when the retaining member is used in the dynamoelectric device.

16. A retaining member for use in a dynamoelectric device having windings in a slot between adjacent poles of the device to limit migration of the windings from between the adjacent poles and out of the slot, the retaining member being of the type that include a main body having opposite axial edges that are configured to engage the adjacent poles so as to hold the retaining member and the windings in the slot when the retaining member is used in the dynamoelectric device, the retaining member comprising:

at least one locking mechanism formed on the retaining member, the locking mechanism being a resilient tab that extends axially from an axial end of the retaining member to a free end of the tab, the tab having a wedge shaped protrusion at its free end, the wedge shaped protrusion having a sloped surface that tapers toward the free end of the tab and a locking surface that is adjacent the sloped surface and on an opposite side of the sloped surface from the free end of the tab, the sloped surface of the wedge shaped protrusion being adapted to radially deflect the tab when the retaining member is being axially inserted, tab first, into the slot and the locking surface being adapted to engage a portion of the dynamoelectric device to limit axial translation of the retaining member relative to the adjacent poles once the retaining member is fully inserted into the slot of the dynamoelectric device.

17. A retaining member for use in a dynamoelectric device having windings in a slot between adjacent poles of the device to limit migration of the windings from between the adjacent poles and out of the slot, the retaining member being of the type that include a main body having opposite axial edges that are configured to engage the adjacent poles so as to hold the retaining member and the windings in the slot when the retaining member is used in the dynamoelectric device, the retaining member comprising:

at least one locking mechanism formed on the retaining member, the locking mechanism being a pair of resilient arms that extend axially from an axial end of the retaining member to free ends of the arms, the arms having wedge shaped protrusions, each wedge shaped protrusion having a sloped surface that tapers toward the free end of the arm and a locking surface that is adjacent the sloped surface and on an opposite side of the sloped surface from the free end of the arm, the sloped surfaces of the wedge shaped protrusions are adapted to engage inner edges of the adjacent poles to deflect the arms toward each other when the retaining member is being axially inserted, arms first, into the slot, the locking surfaces being adapted to engage a portion of the adjacent poles to limit axial translation of the retaining member relative to the adjacent poles once the retaining member is fully inserted into the slot and the sloped surfaces of the wedge shaped protrusions pass the adjacent poles.

18. A retaining member for use in a dynamoelectric device having windings in a slot between adjacent poles of the device to limit migration of the windings from between the adjacent poles and out of the slot, the retaining member being of the type that include a main body having opposite axial edges that are configured to engage the adjacent poles so as to hold the retaining member and the windings in the slot when the retaining member is used in the dynamoelectric device, the retaining member comprising:

at least one locking mechanism formed on the retaining member, the locking mechanism being at least one wedge shaped barb configures to project toward and engage with one of the adjacent poles to limit axial translation of the retaining member relative to the adjacent poles when the retaining member is used in the dynamoelectric device.

19. A retaining member for use in a dynamoelectric device having windings in a slot between adjacent poles of the device to limit migration of the windings from between the adjacent poles and out of the slot, the retaining member being of the type that include a main body having opposite axial edges that are configured to engage the adjacent poles so as to hold the retaining member and the windings in the slot when the retaining member in used in the dynamoelectric device, the retaining member comprising:

at least one lacking mechanism formed on the retaining member, the locking mechanism being at least one wedge shaped protrusion extending from the main body of the retaining member, the wedge shaped protrusion having a sloped surface that tapers toward an axial end of the retaining member and a locking surface adjacent the sloped surface and on an opposite side of the sloped surface from the insertion end of the retaining member, the sloped surface of the wedge shaped protrusion being adapted to engage and slide over a surface of at least one of the adjacent poles as the retaining member is being axially inserted into the dynamoelectric device and to disengage the at least one of the adjacent poles once the portion of the at least one of the adjacent poles to limit axial translation of the retaining member relative to the adjacent poles once the sloped surface disengages the at least one of the adjacent poles.

\* \* \* \* \*